United States Patent
Jensen et al.

(10) Patent No.: US 6,305,266 B1
(45) Date of Patent: Oct. 23, 2001

(54) PISTON OR PLUNGER AND A METHOD FOR MAKING THE SAME

(75) Inventors: Leo Jensen, Ålsgårde; Agge Jan Tonndorff, Virum, both of (DK)

(73) Assignee: W.S. Shamban Europa A/S, Helsingor (DK)

( * ) Notice: Subject to any disclaimer, the term of this patent is extended or adjusted under 35 U.S.C. 154(b) by 0 days.

(21) Appl. No.: 09/454,844

(22) Filed: Dec. 6, 1999

Related U.S. Application Data

(60) Provisional application No. 60/120,662, filed on Feb. 19, 1999.

(30) Foreign Application Priority Data

Dec. 4, 1998 (DK) .................................................. 98 01598

(51) Int. Cl.[7] .................................... F16J 1/04; F16J 9/00
(52) U.S. Cl. .................................................. 92/248; 92/212
(58) Field of Search .............................. 92/172, 248, 155, 92/212, 223; 29/888.04, 888.042, 888.044, 888.048

(56) References Cited

U.S. PATENT DOCUMENTS

| | | | |
|---|---|---|---|
| 1,327,895 | * 1/1920 | Apostoloff | 92/172 X |
| 1,467,257 | * 9/1923 | Thomson | 92/155 |
| 3,212,411 | 10/1965 | Storms | 92/248 |
| 3,983,793 | * 10/1976 | Beardmore | 92/212 X |
| 5,070,971 | 12/1991 | Dourson et al. . | |
| 5,520,092 | 5/1996 | Iida et al. . | |
| 5,588,350 | 12/1996 | Bowell, Sr. . | |

FOREIGN PATENT DOCUMENTS

| | | |
|---|---|---|
| 0658611 | 6/1995 | (EP) . |
| 2072797 | 10/1981 | (GB) . |
| 61025730 | 2/1986 | (JP) . |
| 61082072 | 4/1986 | (JP) . |
| 61116135 | 6/1986 | (JP) . |
| 62231725 | 10/1987 | (JP) . |

* cited by examiner

Primary Examiner—John E. Ryznic
(74) Attorney, Agent, or Firm—Klein & Szekeres, LLP

(57) ABSTRACT

A piston or plunger and a method for making the same

A piston or plunger comprises a piston body and a sealing member. The piston body is preferably made from metal by moulding, such as casting or pressure moulding and sintering. The sealing member is made from a thermoplast, such as polytetrafluoroethylene (PTFE). The piston body has an outer or an inner peripheral surface part in which axially extending depressions or grooves are formed during moulding of the piston body. The axially extending grooves may be open at one or at opposite ends. An annular sealing member blank is applied to the peripheral surface part and is deformed and forced into tight engagement with the peripheral surface part and into the grooves or depressions formed therein. The sealing member formed is also exposed to a heat treatment.

The piston or plunger having the sealing member applied to an outer peripheral surface part may, for example, be used in shock absorbers. Alternatively, the sealing member may be applied to an inner peripheral surface part. In such case the piston or plunger may be used as a stationary sealing device for encircling and sealingly guiding a reciprocating shaft or a piston rod.

24 Claims, 3 Drawing Sheets

PISTON OR PLUNGER AND A METHOD FOR MAKING THE SAME

CROSS-REFERENCE TO A RELATED APPLICATION

This application claims benefit, under 35 U.S.C. Section 119(e), of Provisional Application No. 60/120,662 filed Feb. 19, 1999.

FIELD OF THE INVENTION

The present invention relates to a method of making a piston or plunger which comprises a piston body defining a peripheral surface part thereon and a sealing member made from a deformable material and being in tight engagement with said peripheral surface part. Such pistons or plungers may co-operate with pneumatic or hydraulic cylinders or may form part of any kind of piston pump. As an example, a piston or plunger of this type may be used in shock absorbers for cars or other vehicles.

DESCRIPTION OF PRIOR ART

U.S. Pat. No. 3,212,411 discloses a piston of the above type. The known piston includes a metal piston body having annular grooves formed in an outer peripheral surface part thereof by machining. A sealing member blank made from a thin sheet of polytetrafluoroethylene (PTFE) is pressed and deformed into tight engagement with the outer peripheral surface part of the piston body and into the annular grooves formed therein by means of a heated sizing tube with a tapered entrance. After treatment in the heated sizing tube, the piston body with the sealing member formed thereon is immediately introduced into a cooling tube wherein the sealing member is maintained in a confined condition with respect to the grooved surface part of the piston member.

Thus, according to the prior art a metal piston body blank is made by a moulding process, such as by casting or metal powder sintering. In the moulding process the piston body is formed with a smooth outer peripheral surface. Subsequently, a plurality of annular, peripherally extending, axially spaced channels or grooves are formed in the piston body blank by machining, such as by turning. The need for separately forming the grooves in the peripheral surface of the piston body substantially increases the production costs of the piston or plunger.

GENERAL DESCRIPTION OF THE INVENTION

The present invention provides a method of making a piston or plunger of the above type in a more economical manner.

Thus, the present invention provides a method of making a piston or plunger which comprises a piston body defining a peripheral surface part thereon and a sealing member made from a deformable material and being in tight engagement with said peripheral surface part, said method comprising: forming the piston body, forming grooves or depressions in the peripheral surface part of the piston body, applying an annular sealing member blank around said piston body, and deforming the sealing member blank into tight engagement with the peripheral surface part and into the grooves or depressions formed therein so as to form the shape of said sealing member in situ on the piston body, and the method according to the invention is characterised in that the grooves or depressions are formed so as to extend axially in an inner and/or outer peripheral surface part of the piston body when the piston body is formed by a moulding process.

It has been found that the sealing member may be safely retained on the peripheral surface of the piston body by the engagement of the sealing member with the axially extending grooves even when exposed to the axial forces usually occurring during use. Because the grooves or depressions extend axially they may be formed while the piston body is being moulded in a simple two-part mould, and no subsequent machining is necessary.

EP 0 658 611 discloses a piston body for a shock absorber. This piston body has a peripheral surface part having axially extending grooves or channels formed therein for engaging with a sealing member. However, this prior teaches that the sealing member should be applied to the piston body by inserting the piston body into an injection moulding machine by injection moulding the sealing member on the peripheral surface part of the piston body.

The annular sealing member blank may, for example, be a disk or tube, or it may have any other suitable form, such as a strip or band or a piece of sheet material, which—in an annular shape—is applied to an outer and/or inner peripheral surface part of the piston body. When the sealing member blank is applied to an inner peripheral surface part the piston or plunger formed may be in the form of an annular guiding member surrounding and sealingly engaging with a reciprocating shaft or a piston rod. When the sealing member blank is applied to an outer peripheral surface part, the sealing member blank is preferably an annular member having an inner diameter not exceeding the maximum outer diameter of the outer peripheral surface part of the piston body.

The axially extending grooves or depressions formed in the peripheral surface part may be closed at both ends. In a preferred embodiment, however, each axially extending groove or depression has an open end. In that case the mould, in which the piston body is formed, may be divided into mould parts which may be moved between open and closed positions in the axial direction of the piston body being formed. The open ends of the grooves or depressions may be positioned at opposite ends of the piston body or at the same end of the body. As an other possibility, the axially extending channels or grooves may be parallel and helical. In this case the mould parts may be moved from their closed to their open position after moulding of a piston body by a combined axial and rotational movement.

The annular sealing member blank which is applied to the piston member may be a substantially flat member which is made or cut from sheet material, for example by punching, or which may be made by cutting slices from a tubular member. The sealing member blank need not be a disc-like member, but could also be a tubular member or may be in the form of a strip, disk or band. When the sealing member blank has been applied to the peripheral surface part of the piston body, it is exposed to radially directed forces so as to deform the blank into engagement with said peripheral surface part. Thus, an annular which should be applied to an outer piston body surface may be passed onto the piston body via a tapered member having its wide end positioned in abutting engagement with one end of the piston body, and the sealing member blank may be deformed by means of a compression tool having an opening defined therein with a diameter exceeding the maximum outer diameter of the piston body, the piston body with the sealing member blank arranged thereon being moving axially in relation to the compression tool through the opening thereof, so as to deform the sealing member blank into the grooves or depressions of the piston body.

The present invention also provides a piston or plunger comprising a piston body defining a inner peripheral surface part thereon, said surface part having grooves or depressions formed therein, and an annular sealing member made from a deformable material and being in tight engagement with said peripheral surface part and extending into said grooves or depressions, so as to retain the sealing member in position on the piston body, and the piston or plunger according to the invention is characterised in that said grooves or depressions are extending axially and has been formed in an inner and/or outer peripheral surface part by a moulding process.

The piston body may be made from metal, such as by casting, extrusion or pressure moulding and/or sintering, or the piston may be made from any other suitable material, such as hard plastic material. The sealing member is preferably made from PTFE or another suitable thermoplast. Each of the grooves or depressions may, for example, have an open end and may extend axially therefrom, and these open ends of the grooves or depressions may either be located at the same or at opposite ends of the piston body. The axially extending grooves or depressions may be parallel with the axis of the piston body being formed or may extend helically in relation to the axis of the piston body.

According to further aspect the present invention provides a piston body for a piston or plunger as described above, said piston body defining a peripheral surface part having grooves or depressions formed therein, and the piston body according to the invention is characterised in that said grooves or depressions are extending axially and has been formed in an inner and/or outer peripheral surface part by a moulding process. The piston body may, for example, be made from metal or a hard plastics material.

BRIEF DESCRIPTION OF THE DRAWINGS

The invention will now be further described with reference to the drawing, wherein.

DESCRIPTION OF PREFERRED EMBODIMENTS

Figure 1:
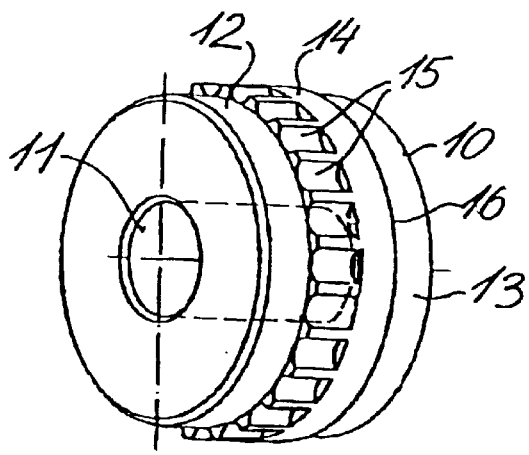
FIG. 1 is a perspective view of a piston body forming part of the piston or plunger according to the invention.
Figure 2:
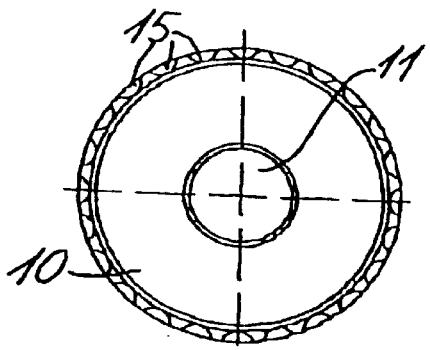
FIG. 2 is a front end view of the piston body shown in FIG. 1.
Figure 3:
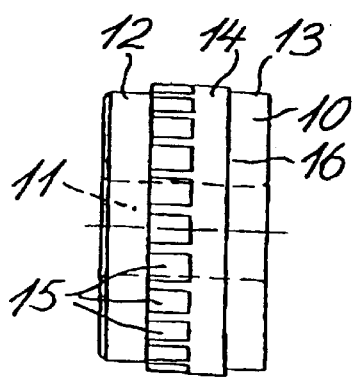
FIG. 3 is a side view of the piston body shown in FIGS. 1 and 2.

The piston body 10 shown in FIGS. 1–3 has been formed integrally, for example from metal, in a mould (not shown) by casting or by compression and sintering metal powder or metal particles, or by any other conventional moulding process.

The piston body 10, which has a central bore 11, comprises first and second axial end sections 12 and 13 and an intermediate central section 14. The end sections 12 and 13 define peripheral outer surface parts, which are substantially cylindrical or slightly tapered. Also the central section 14 defines a cylindrical outer surface part, and the maximum diameter of the central section exceeds the maximum diameters of the end sections 12 and 13. A plurality of closely spaced, axially extending grooves or depressions 15 are formed in the peripheral outer surface of the central section 14. These depressions or grooves 15 are open at the end adjacent to the first section 12 while they are closed at the other end. The maximum radial depth of each depression or groove 15 preferably corresponds substantially to the difference between the maximum radius of the central section 14 and the maximum radius of the first end section 12.

An annular shoulder 16 is formed between the adjacent end of the central section 14 and the second end section 13. It is understood that the piston body illustrated in FIGS. 1–3 could be formed in the mould cavity of a mould, which is divided into two parts, which are movable along the axis of the piston body being formed between open and closed positions. Such mould part could be separated at the shoulder 16. This means that the piston body shown in FIG. 3 could be formed to its final shape in such a mould.

Figure 5:
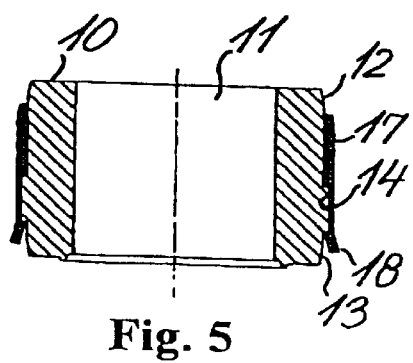
FIG. 5 is a sectional view showing an embodiment of the piston or plunger according to the invention.

The embodiment of the piston body according to the invention shown in FIGS. 1–3 may be formed into a piston or plunger comprising the piston body 10 and a sealing member 17 of a plastic material, such as polytetraflourethylene (PTFE), which has been applied to the peripheral surface of the piston body 10 and which has a sealing lip 18 at one end, vide FIG. 5.

Figure 4:
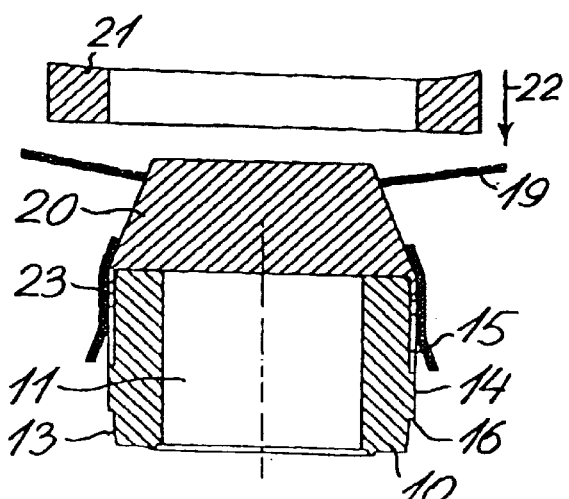
FIG. 4 illustrates how a sealing member blank may be mounted on a piston body of the type shown in FIGS. 1–3.

The sealing member 17 may be mounted on the piston body 10 in a manner known per se and as illustrated in FIG. 4. An annular disc-like sealing member blank 19 made for example from polytetraflourethylene (PTFE) is placed around the narrow end of a frusto-conical mounting tool 20. The wider end of the mounting tool 20 has a diameter corresponding to the outer diameter of the first end section 12 and is positioned in abutting engagement with the end surface of the first end section as shown in FIG. 4. An annular, disc-like female mandrel 21 having an inner diameter slightly exceeding the maximum outer diameter of the central section 14 of the piston body 10 is moved axially around the mounting tool 20 and the piston body 10 as illustrated by an arrow 22 in FIG. 4. Thereby, the disc-like sealing member blank 19 is converted into a tubular shape 23 by plastic deformation. When the mandrel 21 has been moved axially along the total length of the piston body 10 the sealing member blank 19 has been converted into the sealing member 17 shown in FIG. 5. The piston or plunger may then be exposed to further treatment.

Figure 6:
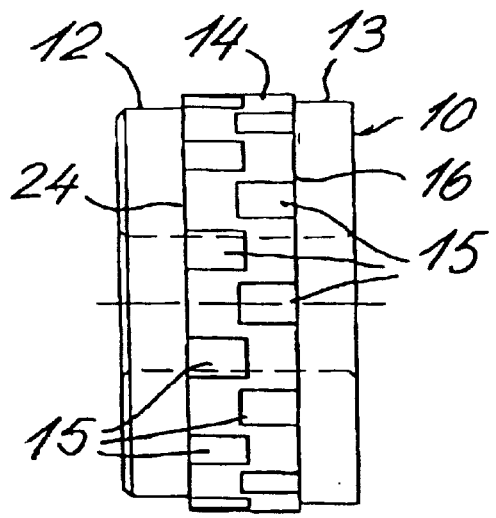
FIG. 6 is a side view of a second embodiment of the piston body.
Figure 7:
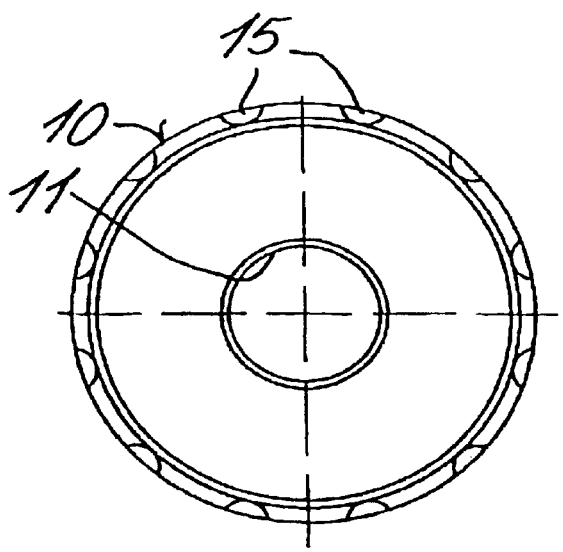
FIG. 7 is an end view of the piston body shown in FIG. 6.
Figure 8:
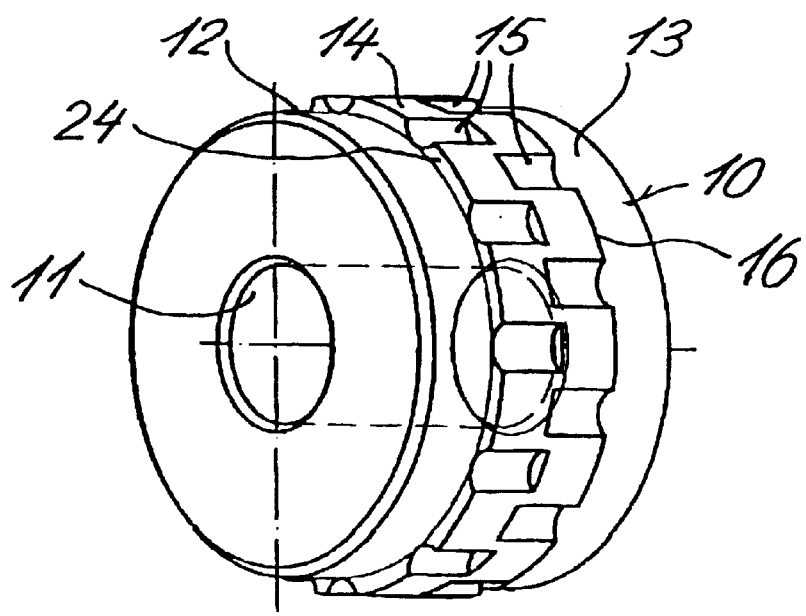
FIG. 8 is a perspective view of the piston body shown in FIGS. 6 and 7, and FIGS. 9–11 are axial sectional views of three further embodiments of the piston or plunger according to the invention.

FIGS. 6–8 illustrate a further embodiment of the piston body 10, in which the pattern of depressions or grooves 15 formed in the central section 14 of the piston body has been changed. Thus, the embodiment shown in FIGS. 6–8 the grooves 15 are arranged in two axially displaced annular arrangements. In one of these annular arrangements each of the grooves 15 opens into the annular shoulder 16, and in the other arrangement each of the grooves 15 opens into an annular shoulder 24, while the other end is closed. As illustrated in FIGS. 6–8 each of the grooves 15 in one of the arrangements is positioned between a pair of adjacent, peripherally spaced grooves in the other arrangement.

A piston body 10 as illustrated in FIGS. 6–8 may be provided with a sealing member in the manner described above in connection with FIGS. 4 and 5 or in any conventional manner, for example as disclosed in the above mentioned U.S. Pat. No. 3,212,411.

Figure 9:
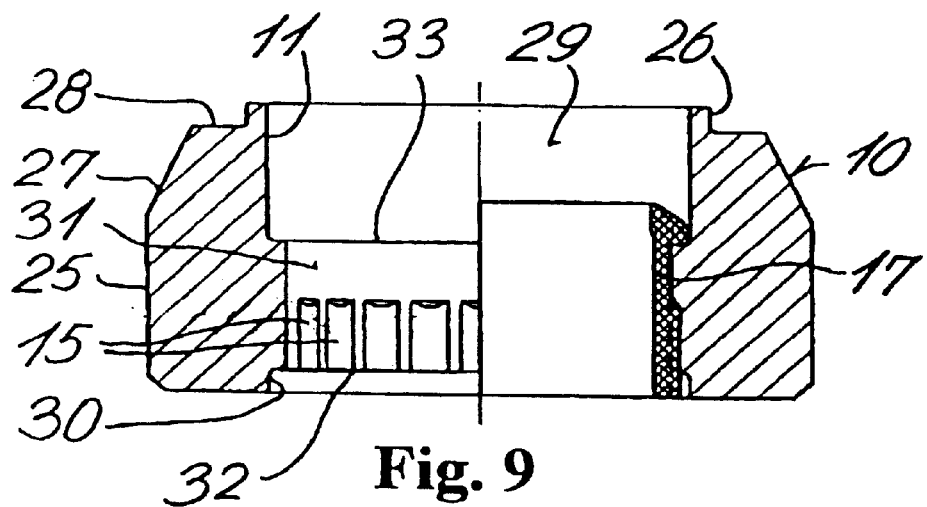
Figure 10:
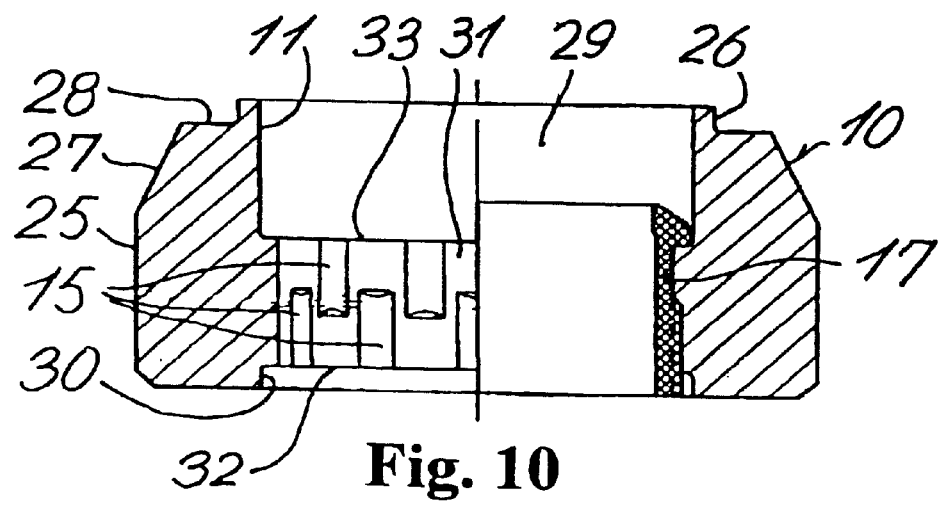
Figure 11:
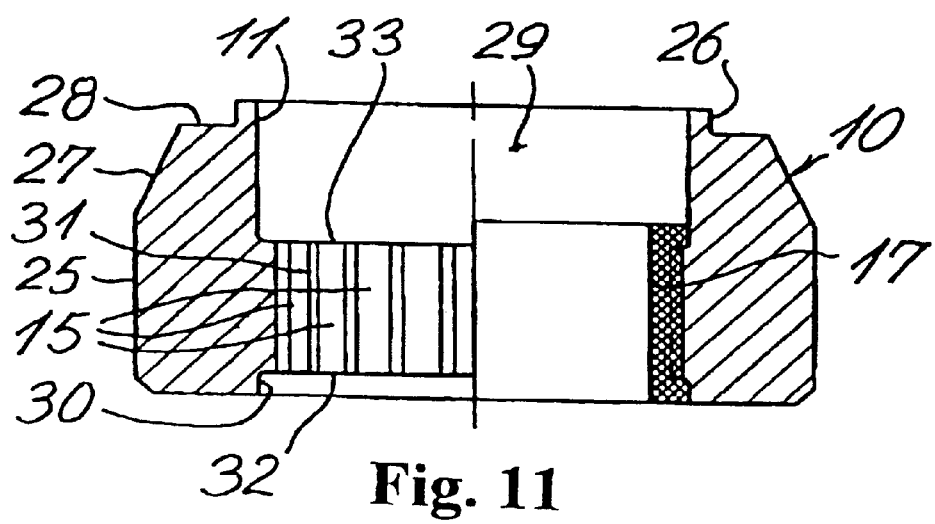

FIGS. 9–11 illustrate three different embodiments of the piston or plunger according to the invention and of the type used for sealingly guiding a reciprocating shaft or piston rod. In all of the embodiments the piston comprises a piston body 10 having a central opening or bore 11. The piston body or sealing body 10 has an outer surface comprising a large diameter cylindrical surface section 25 at one end, and a small diameter cylindrical surface section 26 at the other end. An intermediate conical surface section 27 and an annular radial shoulder 28 interconnect the cylindrical sections 25 and 26.

The central opening or bore 11 comprises a cylindrical inner surface section 29 at one end, a shorter cylindrical inner surface section 30 at the opposite end, and an intermediate cylindrical inner surface section 31 having a diameter which is smaller than that of the sections 29 and 30. A plurality of peripherally spaced depressions or grooves 15 are formed in the intermediate surface section 31. The inner diameter of the inner surface sections 29 and 30 is substantially the same, and the radial depth of each grooved is less than, but preferably substantially equal to the difference between the inner radius of the surface sections 29 and 30 and the inner radius of the intermediate surface section 31. This means that the bottom of each groove 15 is substantially aligned with the inner surface section(s) 29 and/or 30.

In FIGS. 9, 10, and 11 the grooves 15 are arranged differently. In FIG. 9 all of the grooves 15 extend axially from a closed end to an open end and opening into a radial shoulder 32 formed between the inner surface sections 30 and 31. In FIG. 10 the grooves 15 are arranged in two axially displaced annular arrangements. In one of these annular arrangements each of the grooves 15 opens into the radial shoulder 32, and in the other arrangement each of the grooves 15 opens into an annular shoulder 33 formed between the inner surface sections 29 and 31, while the opposite end of each groove 15 is closed. As illustrated in FIG. 10 each of the grooves 15 in one of the arrangements is positioned between a pair of adjacent, peripherally spaced grooves in the other arrangement. In the embodiment illustrated in FIG. 11 each of the peripherally spaced, axially extending grooves 15 is open at both ends and extends between the radial shoulders 32 and 33.

The embodiments of the piston body 10 shown in FIGS. 9–11 may be formed into a sealing device or plunger comprising the piston body 10 and an inner sealing member 17 of polytetraflourethylene (PTFE) or another suitable plastic material. The sealing member 17 may be mounted in the piston or sealing body 10 in a manner similar to that illustrated in FIG. 4. An annular sealing member blank may be placed around the narrow end frusto-conical section of a heated mounting mandrel also having a cylindrical section with an outer diameter corresponding to the desired inner diameter of the finally mounted sealing member. When the mandrel is forced into the inner bore 11 of the piston body the sealing member blank is converted into the tubular sealing member 17 by plastic deformation in a well-known manner. A piston or sealing device of the type shown in FIGS. 9–11 may be stationary and sealingly encircle a reciprocating shaft or piston rod.

EXAMPLE

The piston shown in FIG. 5 may be used as a piston in a conventional shock absorber for use in cars and other vehicles. The axial grooves 15 may have a length being up to 95% of the axial length of the central section 14. The combined peripheral width of all the grooves 15 may cover up to 90% of the circumference of the central section 14. Each of the grooves 15 may have any cross-sectional shape. Thus, the walls defining the grooves may be curved or plane, and the peripheral width of each groove may increase or be substantially the same in an outward radial direction. The radial depth of the each groove 15 may be up to 150% of the thickness of the disc-like sealing member blank 19 which is made from polytetraflourethylene or another suitable plastic material. The polyethylene or plastic material may possibly have particles of bronze or other filler incorporated therein. The mounting of the sealing member blank 19 illustrated in FIG. 4 takes place at a temperature between 20 and 100° C. and the effective outer diameter of the piston or plunger thus produced (FIG. 5.) may then be calibrated by exposing the piston to a suitable temperature between 150 and 260° C.

What is claimed is:

1. A piston or plunger of the type comprising a piston body and an annular sealing member of a deformable material deformed into tight engagement with a peripheral surface part of the piston body, said piston body defining thereon a peripheral surface part having grooves or depressions formed therein while moulding the piston body.

2. A piston body according to claim 1, wherein each of the said grooves or depressions has an open end.

3. A piston body according to claim 2, wherein the open ends of the grooves or depressions are located at the same end of the piston body.

4. A piston body according to claim 1, wherein the grooves or depressions are helical.

5. A piston body according to claim 1, and being made from metal.

6. A method of making a piston or plunger, which comprises a piston body defining a peripheral surface part thereon, and a sealing member made from a deformable material and being in tight engagement with said peripheral surface part, said method comprising:

forming the piston body by a moulding process, forming axially extending grooves or depressions in the peripheral surface part of the piston body while forming the same, applying an annular sealing member blank around said piston body, and deforming the sealing member blank into tight engagement with the peripheral surface part and into the grooves or depressions formed therein so as to form the shape of said sealing member in situ on the piston body.

7. A method according to claim 1, wherein the peripheral surface part is an outer surface part.

8. A method according to claim 1, where the peripheral surface part is an inner surface part.

9. A method according to claim 7, wherein the sealing member blank is an annular member, which is applied to an outer peripheral surface part, the annular member having an inner diameter not exceeding the maximum outer diameter of the outer peripheral surface part of the piston body.

10. A method according to claim 1, wherein each axially extending groove or depression is formed with an open end.

11. A method according to claim 10, wherein the open ends of the grooves or depressions are located at the same end of the piston body.

12. A method according to claim 1, wherein the sealing member blank is an annular, substantially flat member cut from sheet metal.

13. A method according to claim 1, wherein the sealing member blank is tubular.

14. A method according to claim 8, wherein the sealing member blank has an annular shape, the outer diameter of the sealing member blank exceeding the minimum inner diameter of an inner peripheral surface part on the piston body.

15. A method according to claim 1, wherein the sealing member blank is exposed to radially directed forces so as to deform the blank into engagement with the peripheral surface part of the piston body.

16. A method according to claim 9, wherein the sealing member blank is passed onto the piston body via a tapered member having its wide end positioned in abutting engagement with one end of the piston body.

17. A method according to claim 9, wherein the sealing member blank is deformed by means of a compression tool having an opening defined therein with a diameter exceeding the maximum outer diameter of the piston body, the piston body with the sealing member blank arranged thereon being moved axially in relation to the compression tool through the opening thereof, so as to deform the sealing member blank into the grooves or depressions of the piston body.

18. A piston or plunger comprising
a piston body defining a peripheral surface part thereon, said surface part having axially extending grooves or depressions formed therein, and
an annular sealing member made from a deformable material and being deformed into tight engagement with said peripheral surface part and extending into said grooves or depressions, so as to retain the sealing member in position on the piston body.

19. A piston or plunger according to claim 18, wherein the peripheral surface part is an outer peripheral surface part.

20. A piston or plunger according to claim 18, wherein the peripheral surface part is an inner peripheral surface part.

21. A piston or plunger according to claim 18, wherein each groove or depression has an open end.

22. A piston or plunger according to claim 21, wherein the open ends of the grooves or depressions are located at the same end of the piston body.

23. A piston or plunger according to claim 18, wherein the axially extending grooves or depressions are helical.

24. A piston or plunger according to claim 18, wherein the piston body is made from metal.

* * * * *